United States Patent
Costa, Jr. et al.

(10) Patent No.: US 12,301,582 B2
(45) Date of Patent: May 13, 2025

(54) TENANT CONFIGURATION STATE EXTRACTION AND VARIANCE DETECTION

(71) Applicant: Microsoft Technology Licensing, LLC, Redmond, WA (US)

(72) Inventors: Marcio Costa, Jr., Bothell, WA (US); Neil Evan Lydick, Bothell, WA (US); Hua Wang, Bellevue, WA (US); Artur Perez, Redmond, WA (US); Adrian Kyle Wirpel, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 183 days.

(21) Appl. No.: 18/072,586

(22) Filed: Nov. 30, 2022

(65) Prior Publication Data
US 2024/0015163 A1 Jan. 11, 2024

Related U.S. Application Data

(60) Provisional application No. 63/358,800, filed on Jul. 6, 2022.

(51) Int. Cl.
*H04L 9/40* (2022.01)
*G06F 9/445* (2018.01)
*G06F 9/54* (2006.01)

(52) U.S. Cl.
CPC .......... *H04L 63/104* (2013.01); *G06F 9/4451* (2013.01); *G06F 9/547* (2013.01); *H04L 63/20* (2013.01)

(58) Field of Classification Search
CPC ..... H04L 63/104; H04L 63/20; G06F 9/4451; G06F 9/547
See application file for complete search history.

(56) References Cited

U.S. PATENT DOCUMENTS 10,091,055 B2 10/2018 Sundaram et al.
10,313,186 B2 * 6/2019 Wang ...................... H04L 41/40
(Continued)

FOREIGN PATENT DOCUMENTS

| CN | 113179332 A | 7/2021 |
| CN | 113379507 A | 9/2021 |
| CN | 112994941 B | 5/2022 |

OTHER PUBLICATIONS

Shekow, (Syncpal: A simple and iterative reconciliation algorithm for file synchronizers, 2019, 259 pages) (Year: 2019).*

(Continued)

*Primary Examiner* — Oleg Korsak
(74) *Attorney, Agent, or Firm* — Schwegman Lundberg & Woessner, P.A.

(57) ABSTRACT

A method may include receiving, at a server device, a request to extract configuration settings of a source tenant organization from a data store; in response to the request at the server device, recursively accessing the configuration settings of the source tenant organization; generating, at the server device, a configuration tree data structure based on the accessed configuration settings, the configuration tree data structure organized as a plurality of key-value pairs; selecting, at the server device, a target tenant organization; based on the configuration tree data structure, generating, at the server device, a deployment order including chained API calls directed towards the target tenant organization; executing, at the server device, the chained API calls.

20 Claims, 16 Drawing Sheets

(56) References Cited

U.S. PATENT DOCUMENTS

| | | | |
|---|---|---|---|
| 11,048,683 | B2 | 6/2021 | Ackermann |
| 11,385,886 | B2 | 7/2022 | Shmouely et al. |
| 11,467,887 | B1* | 10/2022 | Caudill .................. G06F 9/541 |
| 2020/0257700 | A1* | 8/2020 | Xu ........................ G06F 16/213 |
| 2020/0265062 | A1* | 8/2020 | Srinivasan ............ G06F 9/4416 |
| 2022/0086190 | A1 | 3/2022 | Nguyen |
| 2022/0150133 | A1 | 5/2022 | Dhruvakumar et al. |
| 2022/0188004 | A1 | 6/2022 | Groetzner et al. |
| 2022/0342933 | A1* | 10/2022 | Lydick ................ G06F 16/2433 |

OTHER PUBLICATIONS

"International Search Report and Written Opinion Issued in PCT Application No. PCT/US23/024630", Mailing Date: Sep. 22, 2023, 09 Pages.

"Manage Microsoft 365 tenant configuration by using Microsoft365DSC and Azure DevOps", Retrieved from: https://learn.microsoft.com/en-us/azure/architecture/example-scenario/devops/manage-microsoft-365-tenant-configuration-microsoft365dsc-devops, Sep. 22, 2022, 5 Pages.

Mohammadi, et al., "OData Expand", Retrieved from: https://learn.microsoft.com/en-us/odata/webapi/odata-expand#expand, Dec. 6, 2019, 6 Pages.

Bedek, Vinko, "How to Keep up With Microsoft 365 Tenant Configuration Changes", Retrieved from: https://www.syskit.com/blog/how-to-keep-up-with-microsoft-365-tenant-configuration-changes/, Aug. 24, 2021, 14 Pages.

Kjerlan, et al., "Overview of Microsoft 365 Lighthouse", Retrieved from: https://learn.microsoft.com/en-us/microsoft-365/lighthouse/m365-lighthouse-overview?view=o365-worldwide, Oct. 27, 2022, 2 Pages.

Leblanc, et al., "Entity Data Model", Retrieved from: https://docs.microsoft.com/en-us/dotnet/framework/data/adonet/entity-data-model, Sep. 15, 2021, 3 Pages.

Madan, et al., "Create an Entity", Retrieved from: https://learn.microsoft.com/en-us/odata/concepts/create-data, Apr. 28, 2022, 2 Pages.

Madan, et al., "Requesting Data", Retrieved from: https://learn.microsoft.com/en-us/odata/concepts/get-data, Apr. 28, 2022, 3 Pages.

Madan, et al., "Update an Entity", Retrieved from: https://learn.microsoft.com/en-us/odata/concepts/update-data, Apr. 28, 2022, 1 Page.

Madan, et al., "Welcome to OData", Retrieved from: https://docs.microsoft.com/en-us/odata/overview, Apr. 28, 2022, 2 Pages.

Golfer, et al., "Overview of Microsoft Graph", Retrieved from: https://learn.microsoft.com/en-us/graph/overview, Jun. 15, 2022, 6 Pages.

Neira, et al., "What is Azure Active Directory?", Retrieved from: https://learn.microsoft.com/en-us/azure/active-directory/fundamentals/active-directory-whatis, Sep. 15, 2022, 6 Pages.

Ohlinger, et al., "Endpoint Management at Microsoft", Retrieved from: https://learn.microsoft.com/en-us/mem/endpoint-manager-overview, Oct. 12, 2022, 4 Pages.

* cited by examiner

```
{
    "@odata.context":
"website/beta/$metadata#deviceManagement/deviceCompliancePolicies(assignments(),scheduledActio
nsForRule(scheduledActionConfigurations()))/$entity", deviceCompliancePolicy property collection

"assignments@odata.context": "
website/beta/$metadata#deviceManagement/deviceCompliancePolicies('32341-162d-4423-8df1-
58e0c4599bbf')/CompliancePolicy/assignments", single assignment instance property collection

"scheduledActionsForRule@odata.context": "
website/beta/$metadata#deviceManagement/deviceCompliancePolicies('32341-162d-4423-8df1-
58e0c4599bbf')/CompliancePolicy/scheduledActionsForRule(scheduledActionConfigurations())", "scheduledActionsForRule": [
        {
            ** single scheduledActionsForRule instance property collection **

"scheduledActionConfigurations@odata.context": "
websitebeta/$metadata#deviceManagement/deviceCompliancePolicies('32341-162d-4423-8df1-
58e0c4599bbf')/ CompliancePolicy/scheduledActionsForRule('32341-162d-4423-8df1-
58e0c4599bbf')/scheduledActionConfigurations", "scheduledActionConfigurations": [
                {
                    ** single scheduledActionConfiguration instance property collection **
                },
                {
                    ** single scheduledActionConfiguration instance property collection **
                }
            ]
        }
    ]
}
```

FIG. 4

```
{
  "artifactPropertyCount": 1,
  "status": "fullyApplied",
  "userSummary": {},
  "aggregateComparison": {
    "artifactDisplayName": "Provisioning Status",
    "missingProperties": {},
    "conflictingProperties": {},
    "equalProperties": {},
    "extraProperties": {},
    "inconsistentProperties": {},
    "intersectingProperties": {}
  },
  "artifactComparisons": [
    {
      "artifactDisplayName": "Provisioning Status",
      "inconsistentProperties": null,
      "intersectingProperties": null,
      "missingProperties": {},
      "conflictingProperties": {},
      "equalProperties": {},
      "extraProperties": {}
    }
  ],
  "artifactData": {
    "totalRowCount": 1,
    "dimensions": [
      {
        "displayName": "Expected Status",
        "dimensionValues": [
          {
            "displayName": "Active"
          }
        ]
      },
      {
        "displayName": "Current Status",
        "dimensionValues": [
          {
            "displayName": "Active"
          }
        ]
      }
    ],
    "artifactDataRows": [
      {
        "dimensionIndexSets": []
      }
    ]
  }
}
```

FIG. 10

OVERVIEW    CREATE CONDITIONAL ACCESS POLICY TO REQUIRE MFA FOR ADMINS

DETECTED STATUS    DEPLOYMENT STATUS
FULLY APPLIED      COMPLETE

DETECTED SETTINGS

| NAME | EQUAL SETTINGS | MISSING SETTINGS | CONFLICTING |
|---|---|---|---|
| LIGHTHOUSE | 7 (7 USERS) | 0 | 0 |
| TEST 2 | 0 | 7 (7 USERS) | 0 |
| TEST 3 | 7 (7 USERS) | 0 | 0 |

DESCRIPTION
This deployment creates a conditional access policy using the
configuration settings that are listed below

MANAGEMENT PORTAL
ACTIVE DIRECTORY

EQUAL SETTINGS    CONFLICTING SETTINGS    MISSING SETTINGS    EXTRA SETTINGS
1                 0                       0                   1

| USERS | CLIENT APPS | DEVICE PLATFORMS | LIGHTHOUSE | TEST2 | TEST3 |
|---|---|---|---|---|---|
| ALL APPLICATIONS | | | | | |
| USER1, USER2 | ALL | ALL PLATFORMS | MFA(ON) | MFA(ON) | |
| USER1, USER2 | ALL | ALL PLATFORMS | | | MFA(ON) |

FIG. 11

Table 1402 (before grouping):

| USERS | BASELINE POLICY | EXISTING POLICY1 | EXISTING POLICY2 | EXISTING POLICY3 | |
|---|---|---|---|---|---|
| USER 1 | REQUIRE MFA | BLOCK | REQUIRE MFA | | CONFLICTS |
| USER 2,3 | REQUIRE MFA | | REQUIRE MFA | | |
| USER 4 | REQUIRE MFA | BLOCK | REQUIRE MFA | REQUIRE APP PROTECTION POLICY | CONFLICTS |
| USER 5,6 | | BLOCK | REQUIRE MFA | | |
| USER 7,8,9,10 | | | REQUIRE MFA | | |

AFTER GROUPING

Table 1404:

| USERS | DEVICE PLATFORMS | BASELINE POLICY | EXISTING POLICY1 | EXISTING POLICY2 | EXISTING POLICY3 | |
|---|---|---|---|---|---|---|
| USER 1 | WINDOWS | REQUIRE MFA | BLOCK | REQUIRE MFA | | CONFLICTS |
| USER 1 | OTHERS | REQUIRE MFA | BLOCK | | | CONFLICTS |
| USER 2,3 | WINDOWS | REQUIRE MFA | | REQUIRE MFA | | |
| USER 2,3 | OTHERS | REQUIRE MFA | | | | |
| USER 4 | WINDOWS | REQUIRE MFA | BLOCK | REQUIRE MFA | REQUIRE APP PROTECTION POLICY | CONFLICTS |
| USER 4 | OTHERS | REQUIRE MFA | BLOCK | | REQUIRE APP PROTECTION POLICY | CONFLICTS |
| USER 5,6 | WINDOWS | | BLOCK | REQUIRE MFA | | |
| USER 5,6 | OTHERS | | BLOCK | | | |
| USER 7,8,9,10 | WINDOWS | | | REQUIRE MFA | | |
| USER 7,8,9,10 | OTHERS | | | | | |

VARIANCE DETECTION RESULTS OVER USER X DEVICE PLATFORM DIMENSIONS

FIG. 14

| USERS | DEVICE PLATFORMS | CLIENT | BASELINE POLICY | EXISTING POLICY1 | EXISTING POLICY2 | EXISTING POLICY3 | |
|---|---|---|---|---|---|---|---|
| USER 1 | WINDOWS | | REQUIRE MFA | BLOCK | REQUIRE MFA | | CONFLICTS |
| USER 1 | OTHERS | | REQUIRE MFA | BLOCK | | | CONFLICTS |
| USER 2,3 | WINDOWS | | REQUIRE MFA | | REQUIRE MFA | | |
| USER 2,3 | OTHERS | | REQUIRE MFA | | | | |
| USER 4 | WINDOWS | BROWSER | REQUIRE MFA | BLOCK | REQUIRE MFA | REQUIRE APP PROTECTION POLICY | CONFLICTS |
| USER 4 | WINDOWS | OTHERS | REQUIRE MFA | BLOCK | REQUIRE MFA | | |
| USER 4 | OTHERS | BROWSER | REQUIRE MFA | BLOCK | | REQUIRE APP PROTECTION POLICY | CONFLICTS |
| USER 4 | OTHERS | OTHERS | REQUIRE MFA | BLOCK | | | |
| USER 5,6 | WINDOWS | | | BLOCK | REQUIRE MFA | | |
| USER 5,6 | OTHERS | | | BLOCK | | | |
| USER 7,8,9,10 | WINDOWS | | | | REQUIRE MFA | | |
| USER 7,8,9,10 | OTHERS | | | | | | |

VARIANCE DETECTION RESULTS OVER USER X DEVICE PLATFORM DIMENSION X CLIENT TYPE DIMENSIONS

TENANT CONFIGURATION STATE EXTRACTION AND VARIANCE DETECTION

RELATED APPLICATIONS

This patent application claims the benefit of priority, under 35 U.S.C. § 119(e), to U.S. Provisional Patent Application Ser. No. 63/358,800, titled "TENANT CONFIGURATION STATE EXTRACTION AND VARIANCE DETECTION," filed on Jul. 6, 2022, which is incorporated by reference in its entirety.

BACKGROUND

Enterprises (e.g., a company) may create endpoint policies to ensure data is accessed only by authorized users, to prevent certain applications from being installed on devices, deploying software updates, etc. Software tools may be used to manage the policies and be stored in a database.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawing.

FIG. 4 is a generated JSON response according to various examples.

FIG. 10 illustrates a result of an API call, according to various examples.

FIG. 11 is a user interface that renders API data, according to various examples

FIGS. 14 and 15 are tables of a variance detection process, according to various examples.

DETAILED DESCRIPTION

Figure 1:
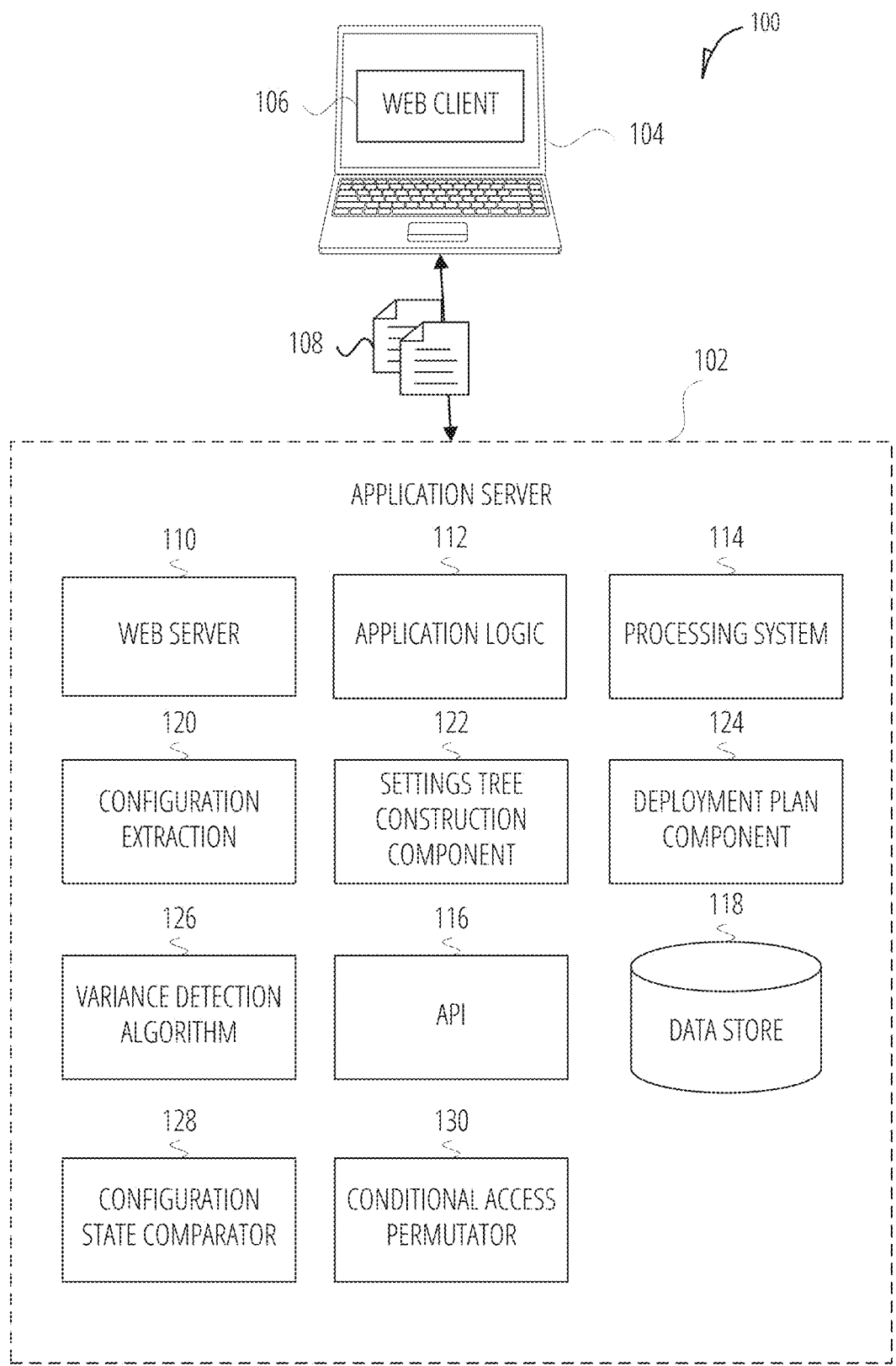
FIG. 1 is an illustration of components of a client device and an application server, according to various examples.

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be performed by components in response to different variable values (e.g., thresholds, user preferences, etc.). As a matter of convenience, this disclosure does not always detail where the variables are stored or how they are retrieved. In such instances, it may be assumed that the variables are stored on a storage device (e.g., Random Access Memory (RAM), cache, hard drive) accessible by the component via an Application Programming Interface (API) or other program communication method. Similarly, the variables may be assumed to have default values should a specific value not be described. User interfaces may be provided for an end-user or administrator to edit the variable values in some instances.

In various examples described herein, user interfaces are described as being presented to a computing device. Presentation may include data transmitted (e.g., a hypertext markup language file) from a first device (such as a Web Server) to the computing device for rendering on a display device of the computing device via a web browser. Presenting may separately (or in addition to the previous data transmission) include an application (e.g., a stand-alone application) on the computing device generating and rendering the user interface on a display device of the computing device without receiving data from a server.

Furthermore, the user interfaces are often described as having different portions or elements. Although in some examples these portions may be displayed on a screen at the same time, in other examples the portions/elements may be displayed on separate screens such that not all of the portions/elements are displayed simultaneously. Unless explicitly indicated as such, the use of "presenting a user interface" does not infer either one of these options.

Additionally, the elements and portions are sometimes described as being configured for a certain purpose. For example, an input element may be described as being configured to receive an input string. In this context, "configured to" may mean presentation of a user interface element that is capable of receiving user input. Thus, the input element may be an empty text box or a drop-down menu, among others. "Configured to" may additionally mean computer executable code processes interactions with the element/portion based on an event handler. Thus, a "search" button element may be configured to pass text received in the input element to a search routine that formats and executes a structured query language (SQL) query with respect to a database.

In various example, a managed service provider (MSP) helps organizations such as small and medium-sized businesses (collectively SMB) customers manage, migrate, and extend their systems and applications to a cloud-based environment (e.g., such as MICROSOFT AZURE®). An administration portal (e.g., MICROSOFT 365 LIGHTHOUSE®) may be used by an MSP to help manage their various customers configurations. In various examples, an organization may be referred to as a tenant of the cloud-based environment. Accordingly, an MSP may manage multiple tenants. An MSP may help secure and manage devices, data, and users at scale for SMBs.

The administrative portal described herein simplifies onboarding of customer tenants by recommending security configuration baselines tailored to SMB customers and providing multi-tenant views across all customer environments. With the administrative portal, MSPs can scale the management of their customers and focus on what's most important-quickly finding and investigate risks, and take action to get their customers to a healthy and secure state.

MSPs define different security configuration baselines depending on the security and licensing requirements of their customers. Those baselines may have been developed using other admin portals such as Azure Active Directory (AAD) and Microsoft Endpoint Manager. Once the baselines are defined in a source environment or tenant, the MSP often needs to make the same configurations using the same admin portals on their customer's tenants. Such procedure can lead to human errors and generate unexpected behavior in the target environments.

The described Tenant State Extractor (TSE) facilitates the distribution and maintenance of baselines across multiple tenants. In summary, the TSE extracts a selected baseline from a source tenant. Then, the TSE converts the baseline's metadata (e.g., the settings) to a reusable format in order to make the extracted data easily maintainable without the necessity of visiting the source administrator portal again. Thus, MSPs can extract policies and configurations from multiple sources and build unique deployment plans for their customers. Those plans can be customized and re-deployed efficiently over time, reducing chances of unexpected behavior and investigation costs.

Additionally, once a baseline has been established a variance detection feature of the admin portal allows a user to measure the degree to which a tenant's current configuration aligns with a desired—or reference—configuration state. The reference configuration state may already have been deployed to the tenant being examined. In such an instance, the purpose of the comparison may be to evaluate whether the tenant's current configuration has drifted from previously applied values. In instances where no attempt has been made to deploy the reference configuration, the reference configuration serves as a desired configuration state against which the tenant's current adherence is being validated. In these cases, the goal of the variance detection feature may be to determine how current configurations (if any) deviate from the desired state. A user (e.g., technician) looking at variance detection results may then decide whether normative interventions are required on the tenant being analyzed.

FIG. 1 is an illustration of components of a client device and an application server, according to various examples. The illustration comprises an application server 102, a web server 110, a client device 104, a web client 106, a data 108, a processing system 114, a configuration extraction 120, a settings tree construction component 122, a deployment plan component 124, an application logic 112, an API 116, a variance detection algorithm 126, a data store 118, a configuration state comparator 128, and a conditional access permutator 130. In various examples, application server 102 may be used to implement the tenant state extractor and variance detection features described herein.

Application server 102 is illustrated as set of separate elements (e.g., component, logic, etc.). However, the functionality of individual elements may be performed by a single element. An element may represent computer program code that is executable by processing system 114. The program code may be stored on a storage device (e.g., data store 118) and loaded into a memory of the processing system 114 for execution. Portions of the program code may be executed in a parallel across multiple processing units (e.g., a core of a general-purpose computer processor, a graphical processing unit, an application specific integrated circuit, etc.) of processing system 114. Execution of the code may be performed on a single device or distributed across multiple devices. In some examples, the program code may be executed on a cloud platform (e.g., MICROSOFT AZURE® and AMAZON EC2®) using shared computing infrastructure.

Client device 104 may be a computing device which may be, but is not limited to, a smartphone, tablet, laptop, multi-processor system, microprocessor-based or programmable consumer electronics, game console, set-top box, or another device that a user utilizes to communicate over a network. In various examples, a computing device includes a display module (not shown) to display information (e.g., in the form of specially configured user interfaces). In some embodiments, computing devices may comprise one or more of a touch screen, camera, keyboard, microphone, or Global Positioning System (GPS) device. Client device 104 may be used by an MSP to extract baselines from tenants and deploy them to other tenants, as well as perform other user-facing functionality as described herein.

Client device 104 and application server 102 may communicate via a network (not shown). The network may include local-area networks (LAN), wide-area networks (WAN), wireless networks (e.g., 802.11 or cellular network), the Public Switched Telephone Network (PSTN) Network, ad hoc networks, cellular, personal area networks or peer-to-peer (e.g., Bluetooth®, Wi-Fi Direct), or other combinations or permutations of network protocols and network types. The network may include a single Local Area Network (LAN) or Wide-Area Network (WAN), or combinations of LAN's or WAN's, such as the Internet. Client device 104 and application server 102 may communicate data 108 over the network. Data 108 may include data payloads, configuration settings for a tenant, etc.

In some examples, the communication may occur using an application programming interface (API) such as API 116. An API provides a method for computing processes to exchange data. A web-based API (e.g., API 116) may permit communications between two or more computing devices such as a client and a server. The API may define a set of HTTP calls according to Representational State Transfer (RESTful) practices. For examples, A RESTful API may define various GET, PUT, POST, DELETE methods to create, replace, update, and delete data stored in a database (e.g., data store 118). One set of APIs may be a common set of calls to access data across a variety of connected services. Thus, a single end point (e.g., www.graph.com/API) may be used to retrieve or edit settings for multiple applications common to an organization. For example, Microsoft Graph APIs are interfaces to a number of network-based services under the Microsoft365 suite of services.

Application server 102 may include web server 110 to enable data exchanges with client device 104 via web client 106. Although generally discussed in the context of delivering webpages via the Hypertext Transfer Protocol (HTTP), other network protocols may be utilized by web server 110 (e.g., File Transfer Protocol, Telnet, Secure Shell, etc.). A user may enter in a uniform resource identifier (URI) into web client 106 (e.g., the INTERNET EXPLORER® web browser by Microsoft Corporation or SAFARI® web browser by Apple Inc.) that corresponds to the logical location (e.g., an Internet Protocol address) of web server 110. In response, web server 110 may transmit a web page that is rendered on a display device of a client device (e.g., a mobile phone, desktop computer, etc.).

Additionally, web server 110 may enable a user to interact with one or more web applications provided in a transmitted web page. A web application may provide user interface (UI) components that are rendered on a display device of client device 104. The user may interact (e.g., select, move, enter text into) with the UI components, and based on the interaction, the web application may update one or more portions of the web page. A web application may be executed in whole, or in part, locally on client device 104. The web application may populate the UI components with data from external sources or internal sources (e.g., data store 118) in various examples.

The web application may be executed according to application logic 112. Application logic 112 may use the various elements of application server 102 to implement the web application. For example, application logic 112 may issue API calls to retrieve or store data from data store 118 and transmit it for display on client device 104. Similarly, data entered by a user into a UI component may be transmitted using API 116 back to the web server. Application logic 112 may use other elements (e.g., configuration extraction 120, settings tree construction component 122, deployment plan component 124, variance detection algorithm 126, etc.) of application server 102 to perform functionality associated with the web application as described further herein.

Data store 118 may store data that is used by application server 102. Data store 118 is depicted as singular element but may in actuality be multiple data stores. The specific storage layout and model used in by data store 118 may take a number of forms-indeed, a data store 118 may utilize multiple models. Data store 118 may be, but is not limited to, a relational database (e.g., SQL), non-relational database (NoSQL) a flat file database, object model, document details model, graph database, shared ledger (e.g., blockchain), or a file system hierarchy. Data store 118 may store data on one or more storage devices (e.g., a hard disk, random access memory (RAM), etc.). The storage devices may be in standalone arrays, part of one or more servers, and may be located in one or more geographic areas.

In various examples, the TSE uses a protocol such as the OData protocol (e.g., a REST API best practices standards protocol) to invoke APIs responsible for representing metadata of a security configuration baseline using an Entity Data Model (EDM) standard. The EDM standard is a set of concepts that describe the structure of data, regardless of its stored form (e.g., it is tenant-agnostic). The EDM addresses the challenges that arise from having data stored in many forms. For example, consider a business that stores data in relational databases, text files, XML files, spreadsheets, and reports. This presents significant challenges in data modeling, application design, and data access. When designing a data-oriented application, the challenge is to write efficient and maintainable code without sacrificing efficient data access, storage, and scalability.

When data has a relational structure, data access, storage, and scalability are very efficient, but writing efficient and maintainable code becomes more difficult. When data has an object structure, the trade-offs are reversed: Writing efficient and maintainable code comes at the cost of efficient data access, storage, and scalability. Even if the right balance between these trade-offs can be found, new challenges arise when data is moved from one form to another. The EDM addresses these challenges by describing the structure of data in terms of entities and relationships that are independent of any storage schema. This makes the stored form of data generally irrelevant to application design and development. And, because entities and relationships describe the structure of data as it is used in an application (not its stored form), they can evolve as an application evolves.

An example EDM is described herein, but others may be used without departing from the scope of this disclosure. The EMD uses three concepts to describe the structure of data: entity type, association type, and property. The entity type describes the structure of data with the EDM. In a conceptual model, entity types are constructed from properties and describe the structure of top-level concepts, such as a customers and orders in a business application. In the same way that a class definition in a computer program is a template for instances of the class, an entity type is a template for entities. An entity represents a specific object (such as a specific customer or order).

An association type (also called an association) describes relationships in the EDM. In a conceptual model, an association represents a relationship between two entity types (such as Customer and Order). Every association has two association ends that specify the entity types involved in the association. Each association end also specifies an association end multiplicity that indicates the number of entities that can be at that end of the association. Entity types contain properties that define their structure and characteristics. For example, a Customer entity type may have properties such as CustomerId, Name, and Address.

Figure 2:
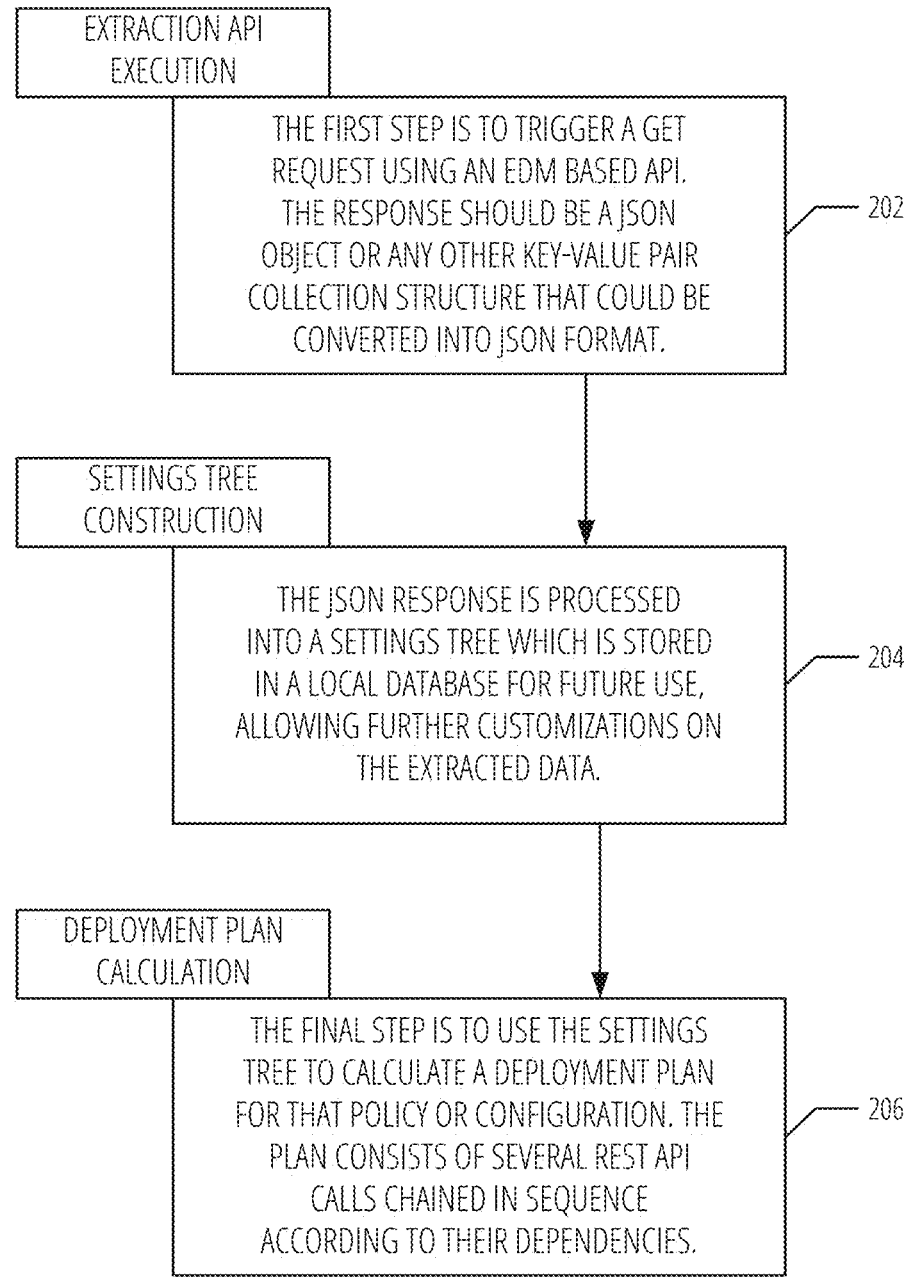
FIG. 2 illustrates a tenant state extractor framework, according to various examples.

FIG. 2 illustrates a tenant state extractor framework, according to various examples. FIG. 2 includes three operations indicated by block 202, block 204, and block 206. At block 202, the extraction API execution may occur. The extraction API may include triggering a GET request using an EDM based API. The response may be a Javascript Object Notion (JSON) object or any other key-value pair collection structure that could be converted into a JSON format. Block 202 may be performed using configuration extraction 120, in various examples.

In various examples, the TSE may be exposed via a REST API by application server 102 (e.g., API 116). The API contract may be established as described below:

```
POST <URL>/{version }/managementTemplates/{identifier }/extract
    {
        "tenantId": "{tenant identifier}",
        "extractionAPI": "{EDM based API}"
    }
```

Consider the following:

```
POST <URL>/beta/managementTemplates/template-code/extract
    {
        "tenantId": "e5fa21f029-11111-4c67-99e0-799a12f0edbced",
        "extractionAPI": "<API
URL>/beta/deviceAppManagement/
windowsInformationProtectionPolicies/xxxx?$expand=
protectedAppLockerFiles,exemptAppLockerFiles,assignments"
    }
```

In the above example, the "windowsInformationProtectionPolicies" are requested along with any of the $expand parameter values. Once the request is received by application server 102, the TSE process may begin.

Once the request reaches the desired endpoint, its payload is validated in order to confirm that the API provided in the extractionAPI parameter is supported and the tenant provided in the tenantId parameter is accessible by the caller. After the validation is complete, an HTTP GET request may be issued based on the provided extraction API targeting the tenant provided in the input parameters. The framework may ensure the authorization for such requests by swapping the necessary tokens to retrieve the data from the tenant.

The response is parsed, and it is sent to the next stage (e.g., block 204) where it will be converted into a settings tree for easier customizations. In various examples, the framework may only move forward to the next stage if the response is in a JSON format. Generating a setting tree is discussed further with respect to FIG. 3, FIG. 4, FIG. 5, and FIG. 6.

After the operations of block 204 is performed, the deployment plan may be generated as discussed in more detail below.

Figure 3:
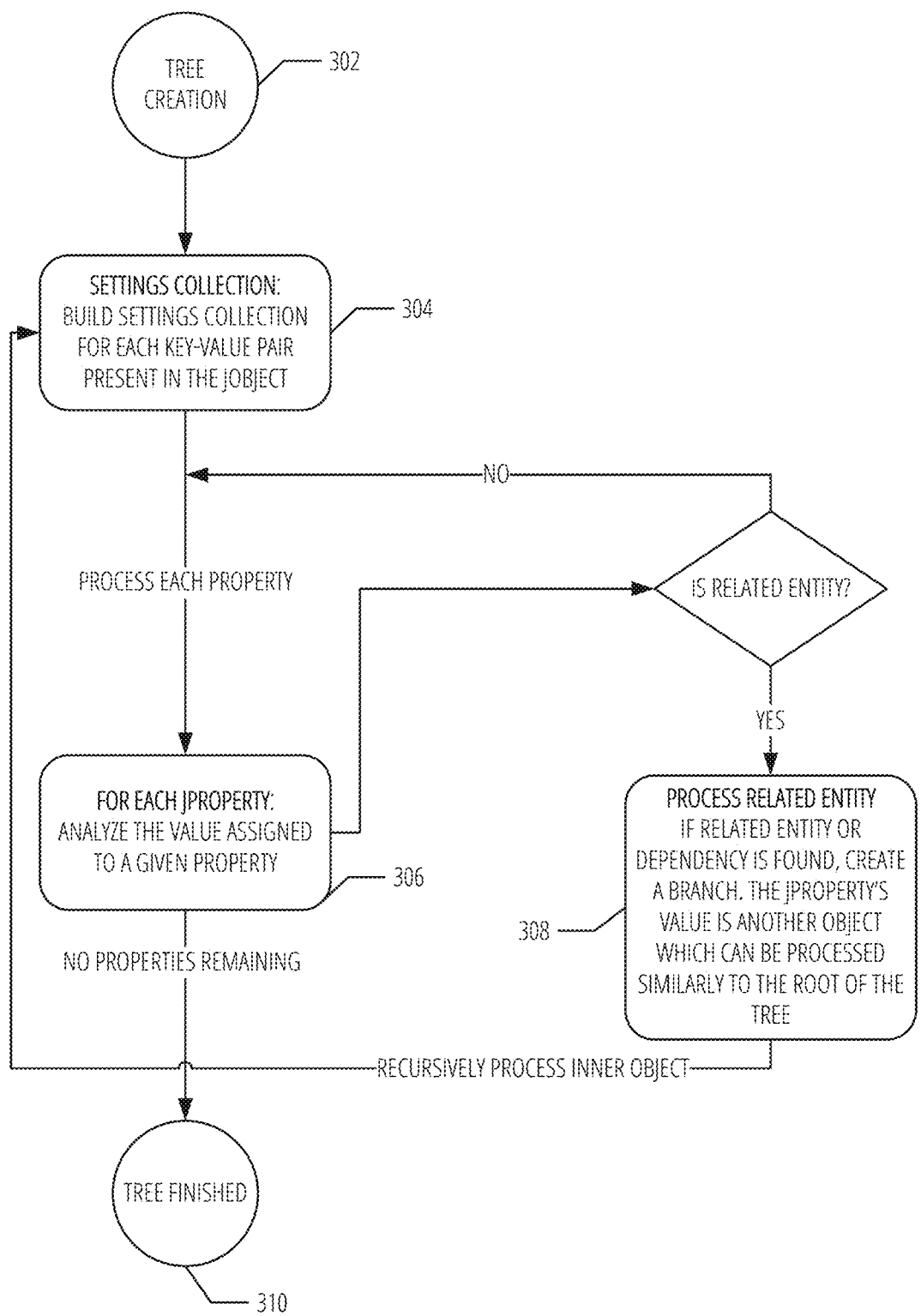
FIG. 3 is a tree creation flow diagram, according to various examples.

FIG. 3 is a tree creation flow diagram, according to various examples. The operations illustrated in FIG. 3 may be performed by settings tree construction component 122 in various examples. The second stage of the TSE framework may include building a tree based on the JSON object (JObject) extracted from the source tenant as illustrated in this figure.

The algorithm starts at operation 302 by processing each JProperty of the JObject extracted from the source tenant (operation 304). If the JProperty consists of a simple key-value pair item, the same is added to a dictionary of type <string, object> (operation 306). If the JProperty consists of a key with the @odata.context suffix and value of type JObject, then a new branch of the tree should be created (e.g., operation 308) and a new instance of the <string, object> dictionary is initialized. Then, the framework recursively processes each JProperty of the inner JObject until there are no more properties to process. After all properties are visited, each dictionary instance is connected accordingly, and a tree is formed as a result (operation 310).

Figure 5:
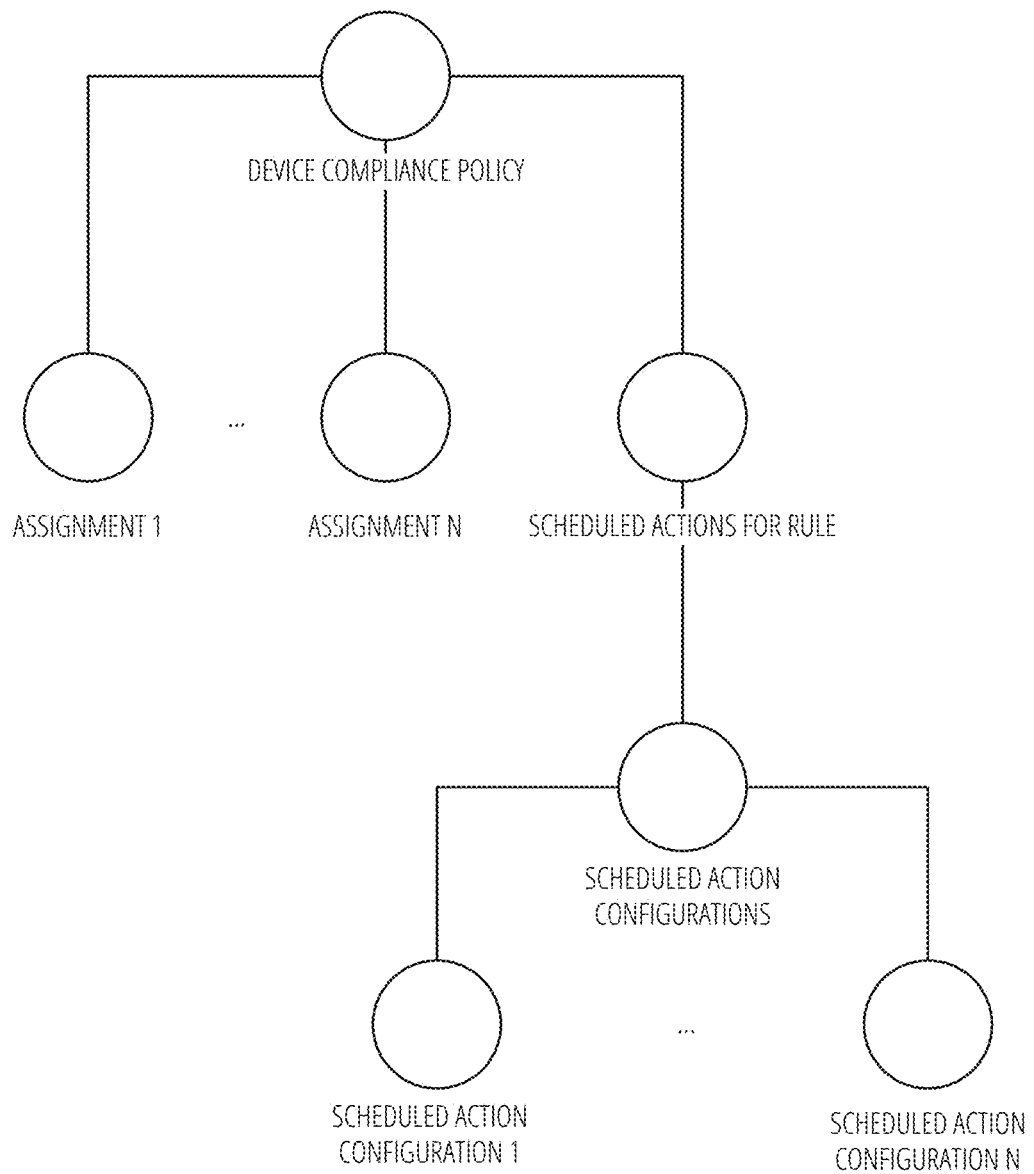
FIG. 5 is a generated tree structure, according to various examples.

Each branch of the tree can be determined by nested $expand calls present in the provided extraction API, given that such calls generate JProperties with the @data.context suffix. For example, an extraction API such as as website/beta/deviceManagement/deviceCompliancePolicies/32341-162d-4423-8df1-58e0c4599bbf?$expand=assignments,scheduledActionsForRule($expand=scheduledActionConfigurations) may generate a response as illustrated in FIG. 4 and generate a tree as illustrated in FIG. 5.

Figure 6:
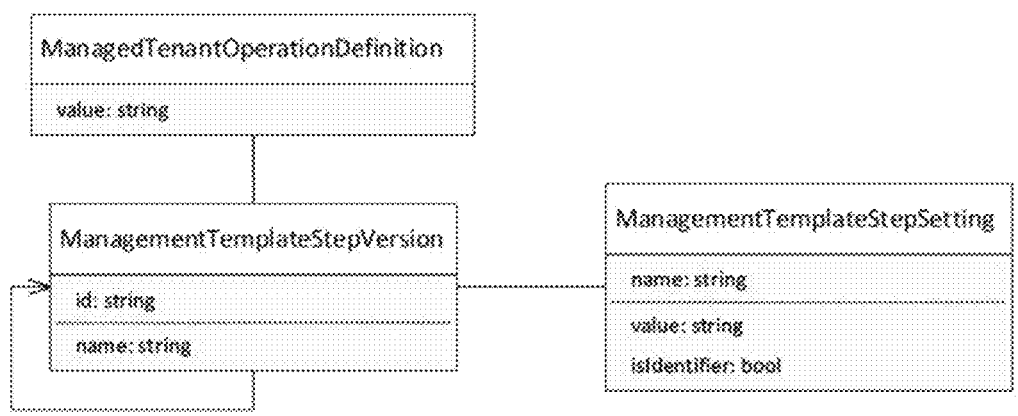
FIG. 6 is a data model, according to various examples.

FIG. 6 is a data model, according to various examples. The property (e.g., settings) tree generated in block 204 may be stored according to the data model depicted in FIG. 6. In various examples, the populated data model is stored in data store 118.

In various examples, each ManagementTemplateStepVersion record holds a collection of ManagementTemplateStepSetting which represents the key-value pairs processed from the extraction response. In case of a dependency or related entity, another ManagementTemplateStepVersion instance is created and connected to the parent record, resulting in a tree of settings available for customization. The extraction API is stored in a ManagedTenantOperationDefinition instance, in the value property, in order to calculate the deployment plan in the last stage of the TSE framework.

The tree data model facilitates further customizations on the extracted properties, due to the fact that a single PATCH request may be executed on a node of the tree to change the value of a property. Such a data model may also be used to determine the deployment plan for the extracted actions—given that each branch of the tree indicates a dependency—and the customizer may enhance it further to add or remove dependencies from their plan.

With reference back to FIG. 2, at block 206 a deployment plan calculation may be made. In various examples, block 206 is performed by deployment plan component 124. The settings tree is used to calculate the deployment order of each action represented by each node. For each node, a GET, PATCH, and POST requests are pre-calculated, where their payload is parametrized based on the latest value of each setting. Thus, when a deployment is triggered starting from the root node, a deployment command order of HTTP requests are chained together across all other dependent nodes. For example, an extraction API such as /entityAs?$expand=entityB would generate the following sequence of HTTP requests:

```
GET /entityAs?$filter=displayName eq '{some name}'
PATCH or POST /entity As { entityA payload }
POST /entity As/{identifier}/entityB { entityB payload }
```

The first GET request is designed to verify the existence of an instance according to a given identifier. By default, the instance's display name is selected as the primary identifier, however such metadata can be customized by changing the isIdentifier property of the corresponding ManagementTemplateStepSetting. If the GET request returns no response, then it indicates that the target instance does not exist—hence a create or POST request needs to be issue—otherwise an update or PATCH request is sent.

The response from the second POST or PATCH request may return the full payload of the persisted entityA record including its identifier (id). That id is used to trigger the next POST request for the creation of entityB, in association to the just written entityA record. Thus, two operations are executed on the second POST record: the creation of a new entityB record and its association with the recently created entityA record.

In summary, MSPs may extract multiple security policies and configurations from different tenants and generate one or more deployment plans to secure their customers according to their needs. By default, the multiple extraction APIs are provided that target several security related customizations (but is applicable to non-security settings as well). Thus, MSPs can use them as guidelines for building their own standards.

Figure 7:
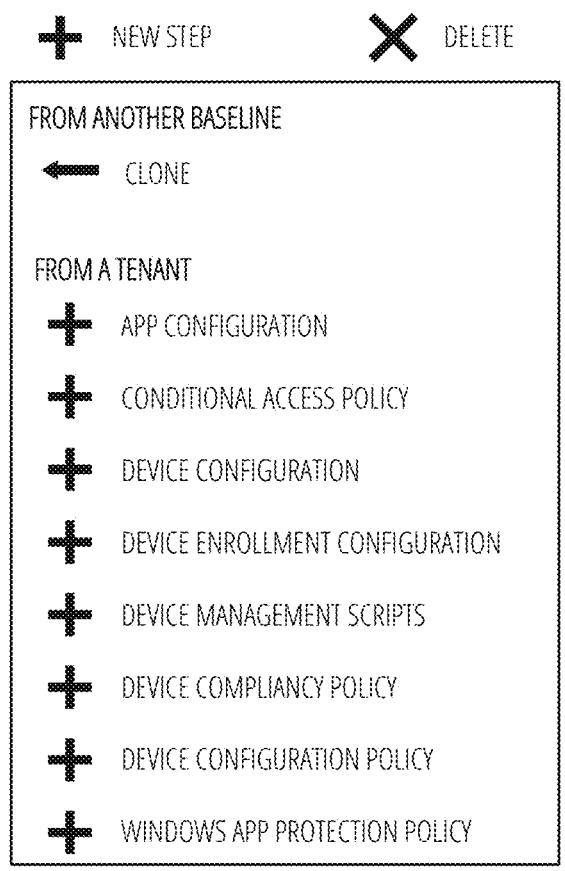
FIG. 7 is a user interface screenshot, according to various examples.

FIG. 7 is a user interface screenshot, according to various examples. The screenshot illustrates the authoring experience for a baseline with some of the extraction options available.

Figure 8:
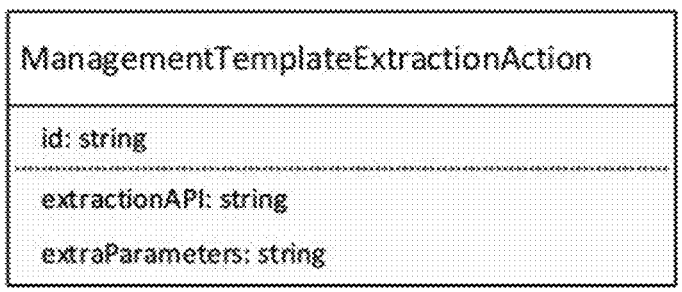
FIG. 8 is data structure model, according to various examples.
Figure 9:
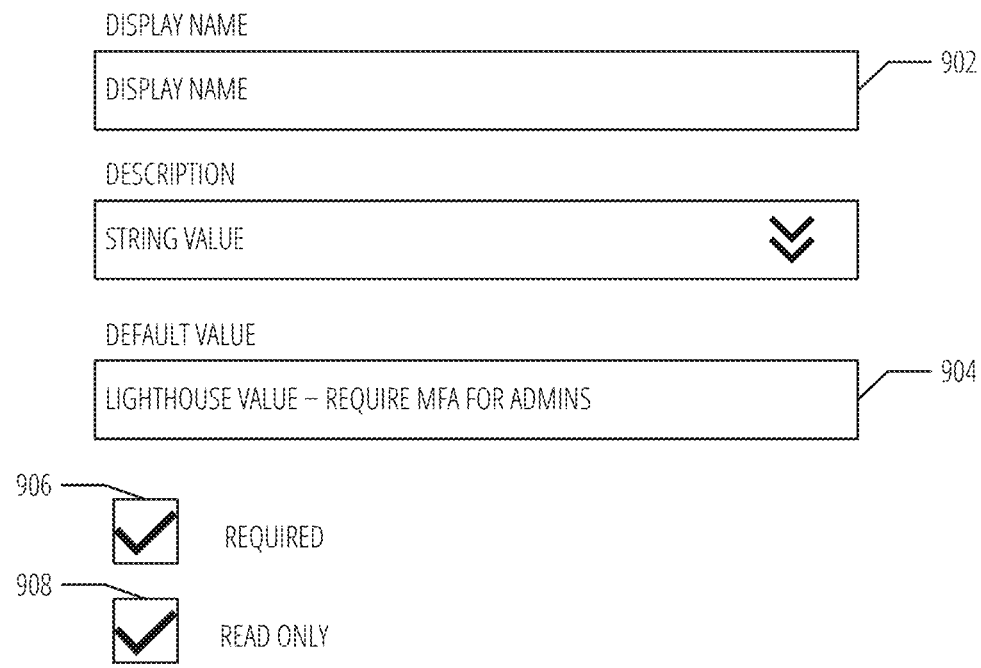
FIG. 9 is a configuration setting user interface, according to various examples.

FIG. 8 is data structure model, according to various examples. The data model to store those actions was designed to be extensible, given that the TSE supports any EDM based solution. The extraction APIs may be stored in a ManagementTemplateExtractionAction entity, and users can add, remove, or edit actions from the list by executing POST, DELETE, or PATCH requests for that entity, respectively. The model in FIG. 8 describes an example data structure of this entity FIG. 9 is a configuration setting user interface, according to various examples. Once the artifact is extracted from the source tenant and stored the customizer can edit the settings processed by the TSE framework. FIG. 9 is a screenshot illustrating an example of such an experience. In FIG. 9, the Display Name setting 902 has the Lighthouse—Require MF4 for Admins default value 904. The customizer may change the default value of that setting which was extracted from a source tenant. Additionally, they may determine if the setting should require input from the user executing the deployment of that artifact by checking the Required checkbox 906. Moreover, the customizer can determine if the setting should not be editable by the user executing the deployment by checking the Read only checkbox 908.

There are some APIs that may not follow the EDM standard entirely; however those APIS may still be used to ensure tenant security. For such cases, special handling may be used, and custom code is embedded into application server 102 to support those APIs. Some examples consist of merging POST calls targeting multiple entities into a single POST call targeting a single entity or providing a different contract for creating and updating records for a target entity.

There are several other applications for the TSE that go beyond artifact extraction, customization, and replication at scale to multiple tenants such variance detection, artifact removal, and data migration.

MSPs can detect variances from the policy or configuration they want to deploy to a target tenant, then identify the consequences of applying the new security standards to that environment. They may also identify the group of users that are not following those standards and address them immediately in order to avoid potential vulnerabilities. A generic comparison algorithm may be applied on the extraction API to identify possible variances.

In addition to creating and updating artifacts deployed to target tenants, MSPs also have the option to remove those artifacts when needed. A DELETE API call may be automatically generated by the TSE and available for invocation on-demand.

Another use for the TSE is to retrieve artifacts from different source tenants, maintain them in a central location, then replicate them to multiple other environments. However, there can be cases that require a direct data migration from one environment to another-especially for non-configuration related artifacts. The TSE may be leveraged to execute such procedure.

The TSE provides a flexible and extensible infrastructure for consumers to retrieve the state from a source environment and replicate it across multiple environments at scale. Additionally, it allows easier maintenance of the extracted data, in union with ordered deployment actions according to dependent entities. Even though one use may be for extracting and customizing security related policies and configurations from certain tenants, the TSE is designed to support any service that follows EDM standards, making it a valuable tool for multi-tenant management in general, not only security related solutions.

The described variance detection algorithm classifies configuration state into discrete configuration object types (e.g.: policy, rule), and value comparisons are performed on instances of matching object types (e.g., using configuration state comparator 128). Configuration object instances that are already defined within the tenant are compared to a reference instance configured within the product. For example, tenant configurations may be stored within data store 118 and reference configuration instances are stored within a feature specific to a product (e.g., baselines as discussed above).

Code within application server 102 (e.g., application logic 112) includes configuration object type metadata that specifies how to transform each configuration object type instance into n-dimensional function that fully represents that instance. In the simple case, each property of a configuration object maps to a one-dimensional function argument ("property") whose domain includes valid property names of properties within that configuration object and whose range includes the possible values for those properties.

As an example, consider Conditional Access Policies for a service containing a single property—grant control—that specifies whether a user login should be approved or rejected. Valid values to which this single argument can be mapped include "Allow user to access with Multi-Factor Authentication (MFA)" or "Deny User Access without MFA". Only one value will be present for any configuration object instance, and the variation detection algorithm can compare the value of policies currently active in the tenant with any user-specified, desired state.

In more complex cases, the algorithm may add function arguments/dimensions for every condition on which a configuration object property is dependent. For example, configuration policies generally are targeted to specific users, groups, or user roles. For the purposes of generating a comparison, this user targeting aspect of Conditional Access Policies is resolved into a "user" dimension, and all possible user values for a tenant with the single grant control property are permuted (e.g., using conditional access permutator 130) to arrive at the configuration function's domain. Other conditions (e.g., application used to log in, user's client type) are similarly added as dimensions and permuted. Once each configuration object instance is transformed into a function sharing a common domain and range, the values associated with each possible combination of function arguments are analyzed for coherence. The process of retrieving the users associated with each role or group relevant to comparison has been parallelized in code as an optimization.

A simplified example function for a configuration policy appears below. Note that the user and login client define the conditions under which the policy applies while the grant control property is inherent to the policy object itself.

| Reference Instance | Tenant Instance 1 | Tenant Instance 2 |
| --- | --- | --- |
| (user=bob, client=browser, property=grant) -> 'deny' (user=sue, client=browser, property=grant) -> 'deny' . . . | (user=bob, client=browser, property=grant) -> 'allow' (user=sue, client-browser, property=grant) -> null . . . | (user=bob, client=browser, property=grant) -> 'deny' (user=sue, client=browser, property=grant) -> 'allow' . . . |

For simplicity, the disclosure refers to each discrete set of function arguments as a "setting," and refers to the output of each configuration object function as the "value" associated with that setting. The function value for each setting in the reference policy is compared to the function values for corresponding settings in existing tenant policies. Each comparison can yield the following outcomes:

| Setting Classification | Definition |
| --- | --- |
| Equal | The setting value in the reference object and tenant object are equal. |
| Conflicting | The setting value in the reference object is different from the setting value in the tenant object. |
| Missing | The setting value in the tenant object is undefined while the setting value in the reference object has a value. |

| Setting Classification | Definition |
| --- | --- |
| Extra | The setting value in the reference object is undefined while the setting value in the tenant object has a value. |
| Inconsistent (special) | This setting is defined on at least two tenant objects and contains different values on each. |

In addition to the point-wise comparisons generated between reference and tenant configurations, an aggregate comparison is computed between the reference configuration object and all tenant configuration objects. This aggregate comparison relies on the point-wise settings comparisons and uses the following priority rule to define an overall settings value comparison, which can be customized per configuration object type: conflicting>equal>missing>extra Consequently, if a setting's value in the reference configuration object is equal to the value of that same setting in an existing tenant configuration object and at the same time missing in a second tenant configuration object, the overall state of the setting in the reference policy is considered equal.

In various examples, each supported type of configuration is associated with a list of "dimension builders". Some "dimension builders" are shared among several types of configurations. For example, the "user" dimension may be shared among Conditional Access Policies, Device Compliance Policies (e.g., Intune Device Compliance Policies) and Configuration Profiles (e.g., Intune Configuration Profiles). Each "dimension builder" may have logic to retrieve dimension specific information from their management portals as APIs (e.g., API 116). They also provide information for user experience to display the values correctly.

To support new dimensions, developers may implement derived classes of DimensionBuilderBase and define how they retrieve the dimension values from the input configurations. If the developers need additional information that is not in the input configurations, they may make calls to retrieve the information with the given credentials.

Variance detection (e.g., variance detection algorithm 126) may be defined as an expression of an API. The baselines feature may allow several "actions," to be executed on behalf of the user to bring a tenant to a desired configuration. Variance detection may a scriptable action. A user may invoke it through an API by calling /API/managementTemplateStepVersion/{id}/validate, and in the payload, specifying a target tenant id and a set of configuration settings which define the configuration object used as a reference. If the required app permissions are available, variance detection may also be invoked online without the user providing their credentials (explicitly through an action or implicitly by loading a page).

The example below passes a conditional access policy conditionalAccessPolicy presented in JSON format as reference configuration and a list of policies retrieved with a call: "v1.0/identity/conditionalAccess/policies", as existing configuration, to a Variance Detection function "sys.validateConditionalAccessPolicy".

FIG. 10 illustrates a result of an API call, according to various examples. The validation result entity is persisted in a data store so that the user may retrieve these results at any time.

FIG. 11 is a user interface that renders API data, according to various examples. The user interface picks up the result (e.g., FIG. 10) stored in a typed entity and displays them in a structured format. Note that all but the final settings dimension is grouped into headers for user readability. The user interface renders using the dimension metadata provided by the API and can accommodate any number of dimensions for analysis.

Besides the comparison results, the UI displays the setting and user statistics for each detected configuration, including whether the configuration has equal, missing, or conflicting settings/users. The UI may support device level statistics and filters on the setting types so that users can view which settings are equal, conflicting, missing or extra.

Besides configuration comparison results, the described variance framework provides a variety of statistics. This includes a user summary, which categorizes users into the following disjointed sets, in various examples:
1. completed users
2. not completed users
3. not targeted users
4. excluded users,
5. unlicensed users Each category may have the following definition:

| User category | definition |
| --- | --- |
| Completed users | Users for whom all intersecting properties in all existing artifacts |
| Not completed users | Users for whom not all intersecting properties in all existing artifacts match |
| Not Targeted users | Users who are not targeted as an included user or as a member of a role or group and not part of the exclusion group |
| Excluded users | Users who are in the exclude list as defined by the reference policy |
| Unlicensed users | Users who are not licensed for this feature |

One reason behind providing user-level reporting is to help a technician map security or management risk to individuals within an organization. In some cases, the framework internally maintains settings classifications that exceed the (equal/conflicting/missing/extra) designations described earlier. These classifications vary based on the type of configuration.

For example, conditional access has different levels of "Access controls". In all cases, the system may define "Block Access" as stricter than "Grant Access" in general. Furthermore, the system may differentiate between levels of "Grant Access" (MFA vs. MFA+Managed Device) to reflect that a certain threshold has been met. That is, the settings comparison exceeds (i.e.: is not just equal to) the standard defined by some reference configuration. Qualitative and quantitative comparisons are possible to achieve and return to the user in this model (e.g.: windows versions).

Figure 12:
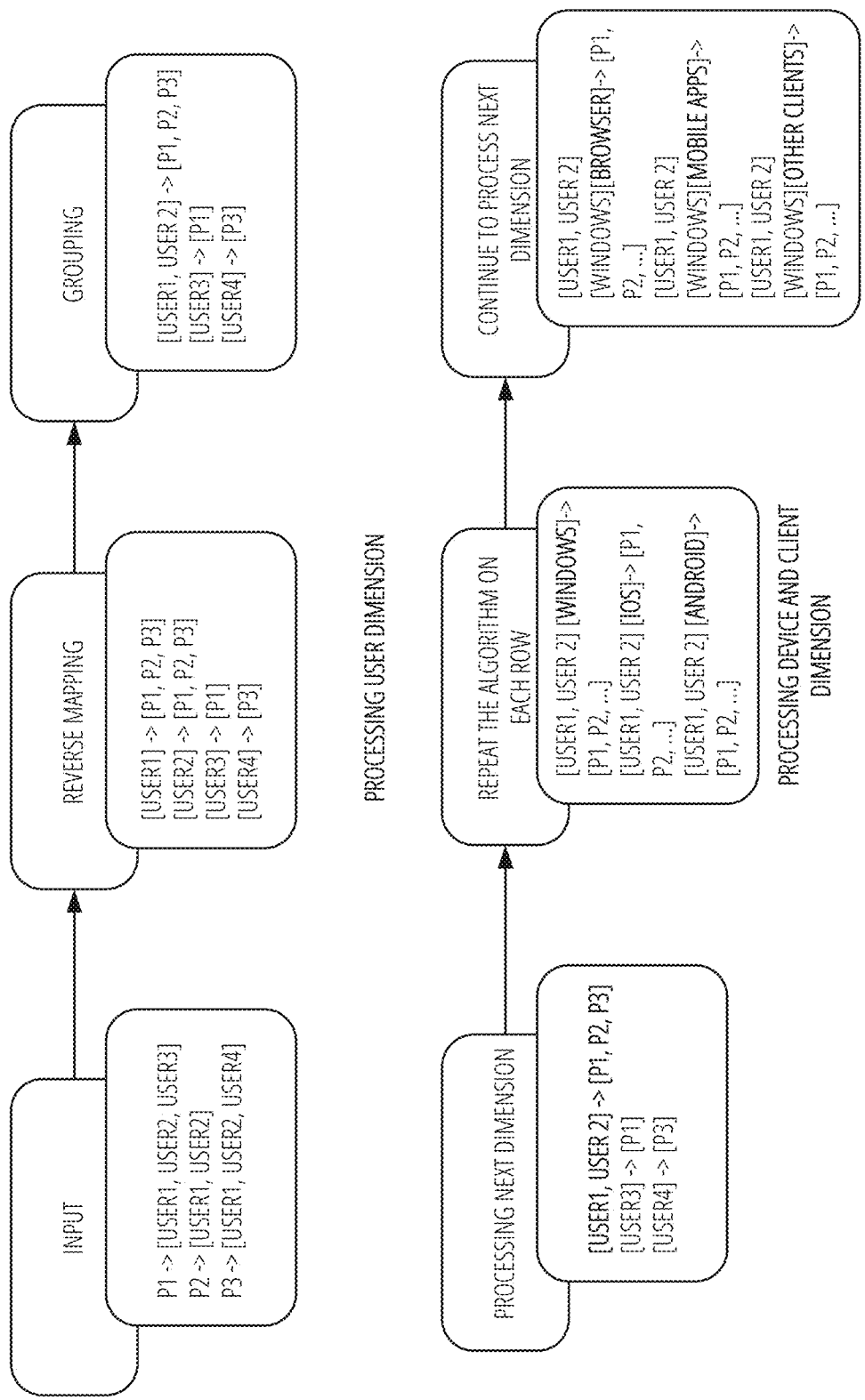
FIG. 12 illustrates evaluating conditional access policies, according to various examples.

Variance detection data may be archived in a database (e.g., data store 118) store to analyze the change in configuration drift over time. With historical data, application server 102 may be able to alert on first and second derivatives of the comparison numbers captured from variance detection APIs. At a minimum, prioritized user alerts may be surfaced that target the following conditions. (1) The number of users not covered by deployed baseline has increased by Y; and (2) The number of users without adequate licensing has increased by X In various examples, variance detection algorithm 126 processes each unique configuration object—both the reference object used as the standard of comparison as well as objects that already exist within the tenant—dimension-by-dimension. For each dimension, these three steps may be run: input preprocessing, reverse-mapping, and grouping. Then the steps may be run on the results from previous dimension. FIG. 12 illustrates evaluating conditional access policies, according to various examples. The figures show an example of evaluating three conditional access policies—p1, p2, p3, over three dimensions: user assignment, device platform and client type.

First, some input values are preprocessed. For example, a policy assignment can have groups, roles, and users. As discussed above, flatten these values may be flattened into "user" and use "user" as dimension values in the further process.

Second, in order to compare values over different dimensions, a reverse-mapping is performed on them. The input may be a list of values mapping to their dimensions. After reverse-mapping, a list of dimension values mapping to the values that associate with those dimensions is obtained so that the values being compared are under the same conditions.

Figure 13:
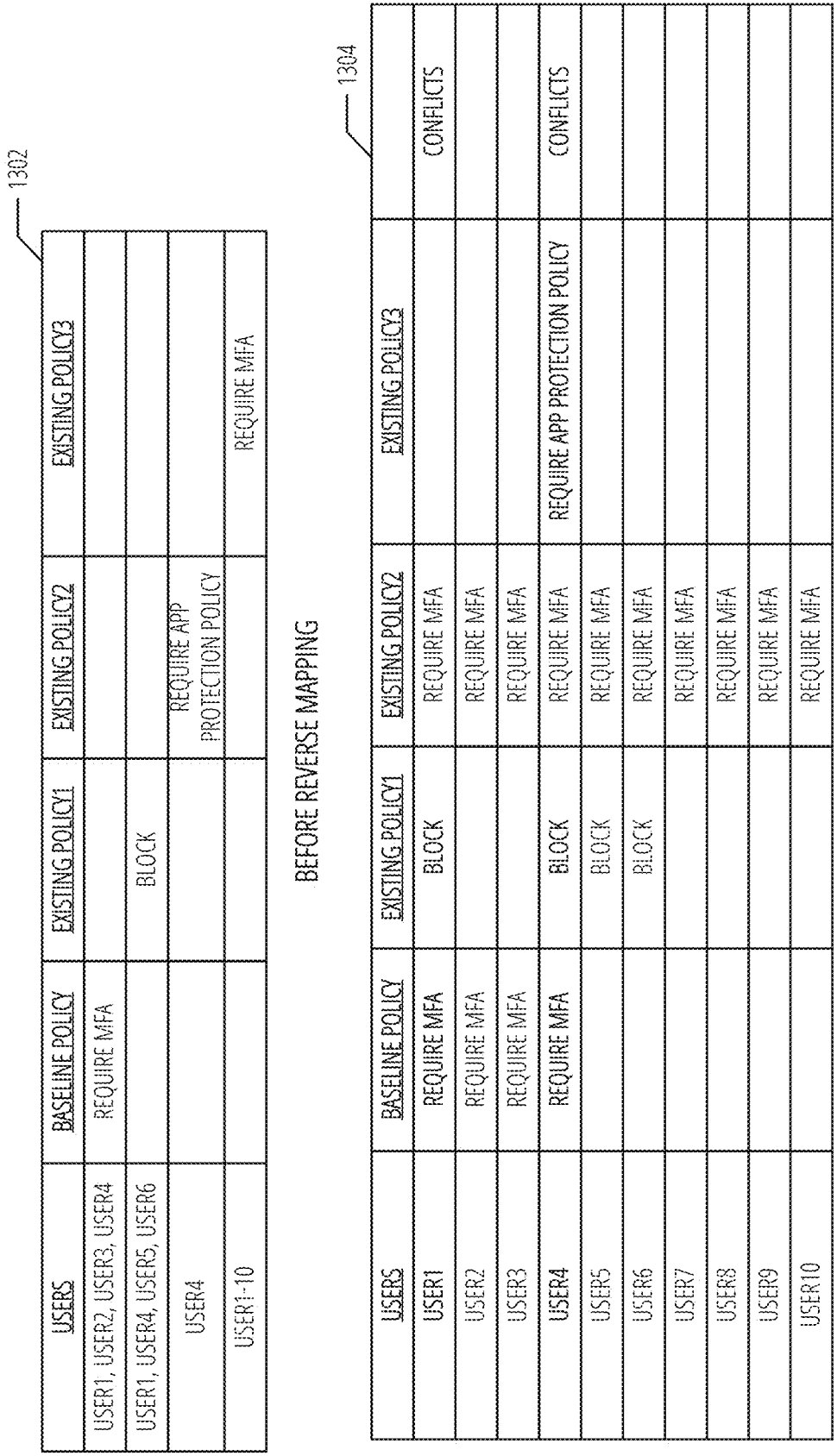
FIG. 13 are tables of a reverse mapping process, according to various examples.

FIG. 13 are tables of a reverse mapping process, according to various examples. In table 1302 four setting values are set to different conditions, so they should not be compared directly. After reverse-mapping (table 1304), all the values under the same condition are put side by side. Therefore, the system can compare the values under the same condition and determine if there is variance. In the bottom table it can be observed there are some conflicts under some conditions.

FIGS. 14 and 15 illustrates tables of a variance detection process, according to various examples. In FIG. 13 the number of comparison results are reduced by grouping some dimension values. In table 1304, user2 and user3, user4 and user6, user7-user10 share the same comparison result. Therefore, those comparison results can be grouped together as shown in table 1402 of FIG. 14. On this step, the variance is detected under different user assignments. These three steps are repeated on the rest of dimensions on top of the result in the top table of FIG. 14. Table 1404 of FIG. 14 shows the variance detection result over two dimensions—user and device platform. The table in FIG. 15 illustrates the result over three dimensions—user, device platform and client types.

Figure 16:
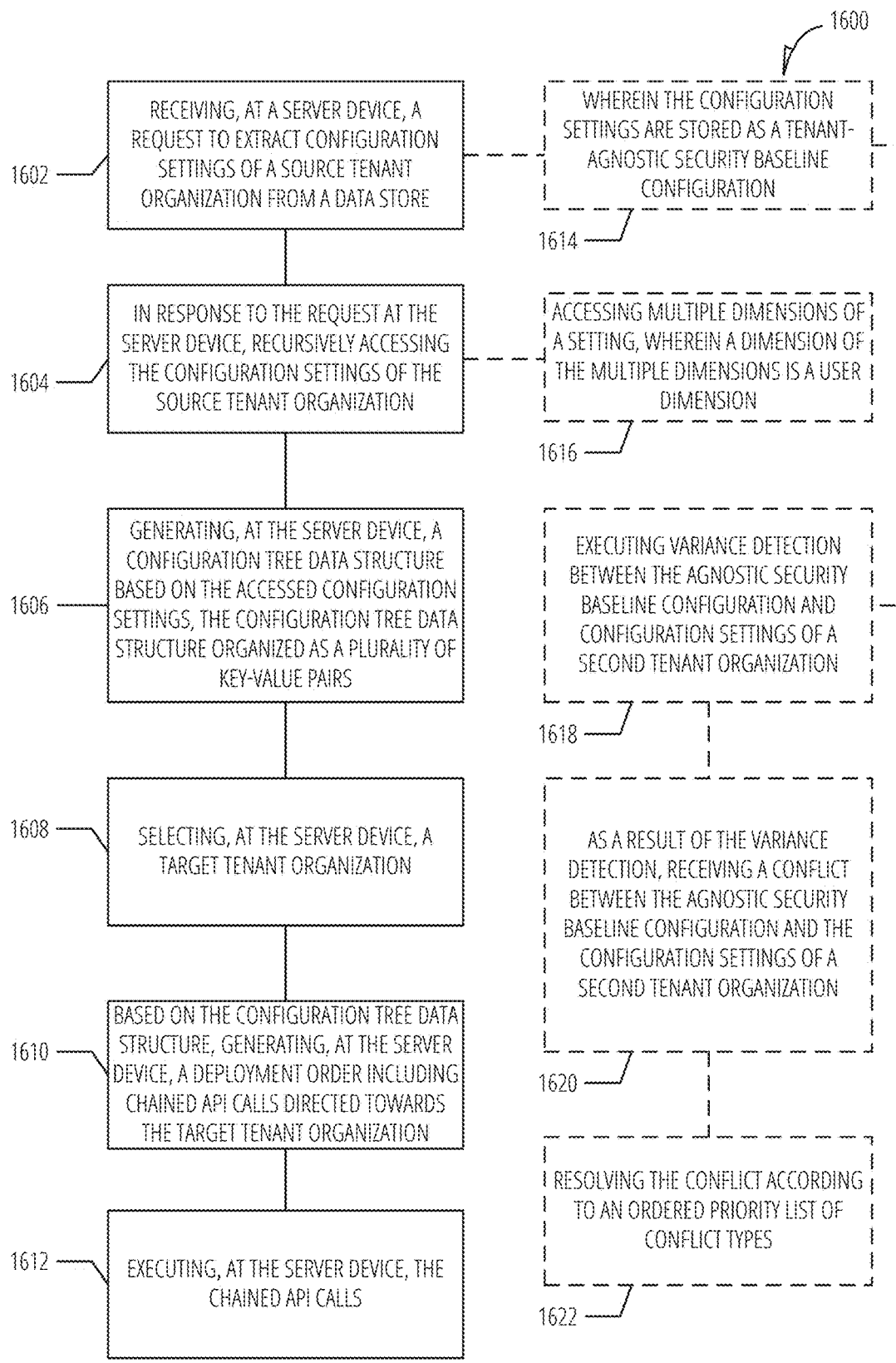
FIG. 16 is a flowchart illustrating operations of a method, according to various examples.

FIG. 16 is a flowchart illustrating operations of a method. The method is represented as a set of blocks that describe operations 1602-1622 of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 16. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure. In various examples, the method is performed on a server device such as described as application server 102. The request may originate from a client device such as client device 104.

In various examples, the method includes at operation 1602, receiving, at a server device, a request to extract configuration settings of a source tenant organization from a data store. For example, the request may include an identifier of the source organization. The request may originate from a client device such as client device 104. At operation 1614, in various examples, the configuration settings may be stored as a tenant-agnostic security baseline configuration.

In various examples, the method includes at operation 1604, in response to the request at the server device, recursively accessing the configuration settings of the source tenant organization. At operation 1616, in various examples, recursively accessing the configuration settings of the source tenant organization may include accessing multiple dimensions of a setting, such as a user dimension.

In various examples, the method includes at operation 1606, generating, at the server device, a configuration tree data structure based on the accessed configuration settings, the configuration tree data structure organized as a plurality of key-value pairs.

In various examples, the method includes at operation 1608 selecting, at the server device, a target tenant organization. The selecting may be based on receiving an identifier of the target tenant organization via a web application.

In various examples, the method includes at operation 1610 based on the configuration tree data structure, generating, at the server device, a deployment order including chained API calls directed towards the target tenant organization. In various examples, the method includes at operation 1612, executing, at the server device, the chained API calls.

In various examples, additional operations may include, at operation 1618 executing variance detection between the agnostic security baseline configuration and configuration settings of a second tenant organization. In various examples, the method includes at operation 1620, as a result of the variance detection, receiving a conflict between the agnostic security baseline configuration and the configuration settings of a second tenant organization. In various examples, the method includes, at operation 1622, resolving the conflict according to an ordered priority list of conflict types.

Figure 17:
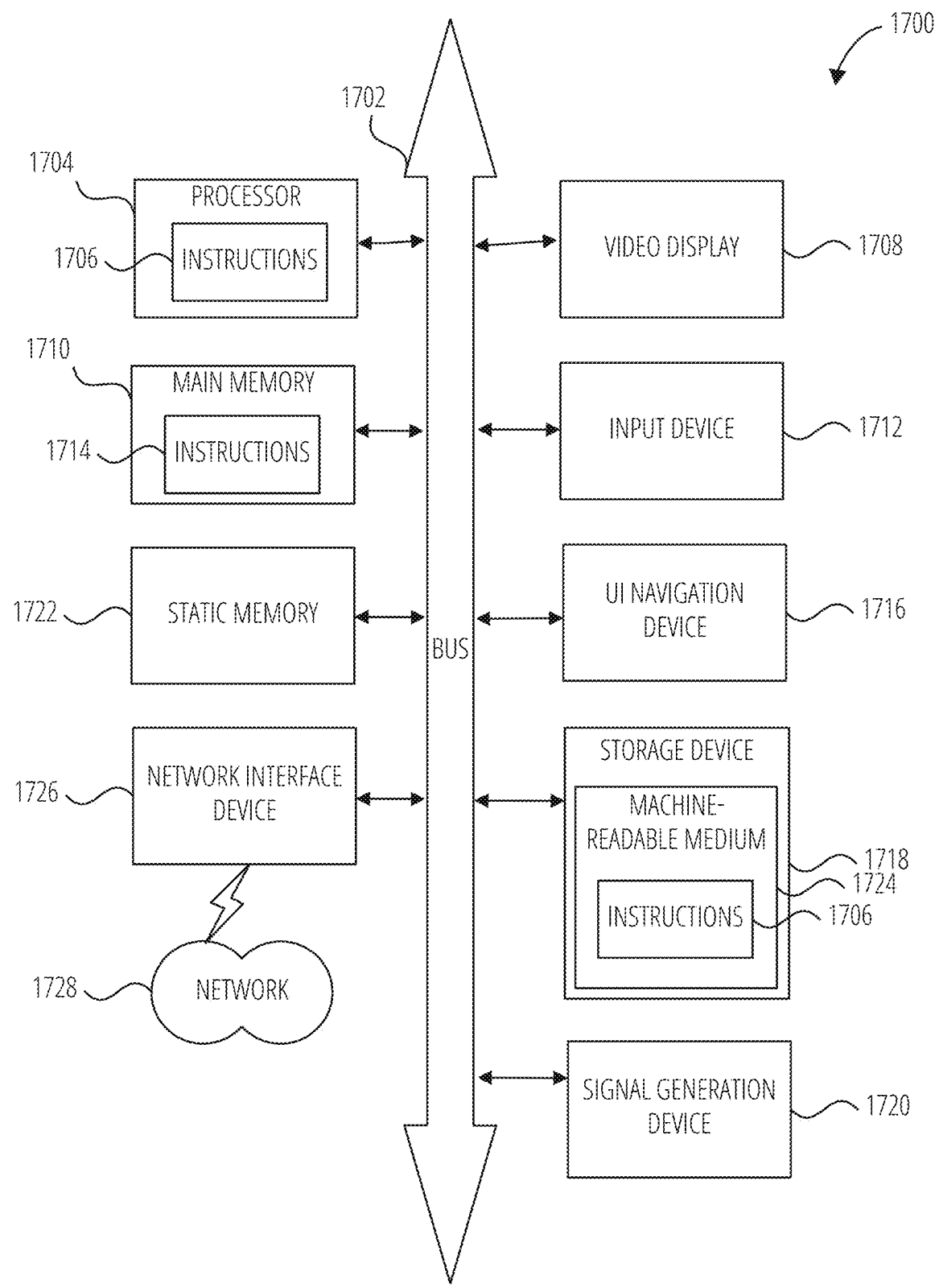
FIG. 17 is a block diagram illustrating a machine in the example form of computer system, within which a set or sequence of instructions may be executed to cause the machine to perform any one of the methodologies discussed herein, according to various examples.

FIG. 17 is a block diagram illustrating a machine in the example form of computer system 1700, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client Network environments, or it may act as a peer machine in peer-to-peer (or distributed) Network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1700 includes at least one processor 1704 (e.g., a central processing unit (CPU), a graphics processing unit (GPU) or both, processor cores, compute nodes, etc.), a main memory 1710 and a static memory 1722, which communicate with each other via a bus 1702. The computer system 1700 may further include a video display 1708, an input device 1712 (e.g., a keyboard), and a user interface (UI) navigation device 1716 (e.g., a mouse). In one embodiment, the video display 1708, input device 1712, and UI navigation device 1716 are incorporated into a single device housing such as a touch screen display. The computer system 1700 may additionally include a storage device 1718 (e.g., a drive unit), a signal generation device 1720 (e.g., a speaker), a network interface device 1726, and one or more sensors (not shown), such as a global positioning system (GPS) sensor, compass, accelerometer, or other sensors.

The storage device 1718 includes a machine-readable medium 1724 on which is stored one or more sets of data structures and instructions 1714 (e.g., software) embodying or utilized by any one or more of the methodologies or functions described herein. The instructions 1714 may also reside, completely or at least partially, within the main memory 1710, static memory 1722, and/or within the processor 1704 during execution thereof by the computer system 100, with the main memory 1710, static memory 1722, and the processor 1704 also constituting machine-readable media.

While the machine-readable medium 1724 is illustrated in an example embodiment to be a single medium, the term "machine-readable medium" may include a single medium or multiple media (e.g., a centralized or distributed Database, and/or associated caches and servers) that store the one or more instructions 1714. The term "machine-readable medium" shall also be taken to include any tangible medium that is capable of storing, encoding, or carrying instructions for execution by the machine and that cause the machine to perform any one or more of the methodologies of the present disclosure or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. A computer-readable storage device may be a machine-readable medium 1724 that excluded transitory signals.

The instructions 1714 may further be transmitted or received over a communications Network 1726 using a transmission medium via the network interface device 1726 utilizing any one of a number of well-known transfer protocols (e.g., HTTP). Examples of communication networks include a local area Network (LAN), a wide area Network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein

What is claimed is:

1. A method performed by a server computer, the method comprising:
   receiving a request to extract configuration settings of a source tenant organization from a data store, wherein the configuration settings define operational parameters that control how a multi-tenant service processes data associated with the source tenant organization;
   in response to the request, accessing the configuration settings of the source tenant organization;
   generating a configuration tree data structure based on the accessed configuration settings, the configuration tree data structure organized as a plurality of key-value pairs;
   selecting a target tenant organization;
   based on the configuration tree data structure, generating a deployment order including chained API calls structured to modify configuration settings of the target tenant organization in the multi-tenant service, wherein the deployment order comprises instructions determined from dependencies derived from the configuration tree data structure; and
   modifying the configuration settings of the target tenant organization for the multi-tenant service by executing the deployment order including the chained API calls.

2. The method of claim 1, wherein the configuration settings are stored as a tenant-agnostic security baseline configuration.

3. The method of claim 2, further comprising:
   executing variance detection between the tenant-agnostic security baseline configuration and configuration settings of the target tenant organization.

4. The method of claim 3, further comprising:
   as a result of the variance detection, receiving a conflict between the tenant-agnostic security baseline configuration and the configuration settings of the target tenant organization.

5. The method of claim 4, further comprising:
   resolving the conflict according to an ordered priority list of conflict types.

6. The method of claim 1, wherein recursively accessing the configuration settings of the source tenant organization includes accessing multiple dimensions of a setting.

7. The method of claim 6, wherein a dimension of the multiple dimensions is a user dimension.

8. A system comprising:
a processing unit,
a storage device comprising instructions, which when executed by the processing unit, configure the processing unit to perform operations comprising:
receiving a request to extract configuration settings of a source tenant organization from a data store, wherein the configuration settings define operational parameters that control how a multi-tenant service processes data associated with the source tenant organization;
in response to the request, accessing the configuration settings of the source tenant organization;
generating a configuration tree data structure based on the accessed configuration settings, the configuration tree data structure organized as a plurality of key-value pairs;
selecting a target tenant organization;
based on the configuration tree data structure, generating a deployment order including chained API calls structured to modify configuration settings of the target tenant organization in the multi-tenant service, wherein the deployment order comprises instructions determined from dependencies derived from the configuration tree data structure; and
modifying the configuration settings of the target tenant organization for the multi-tenant service by executing the chained API calls.

9. The system of claim 8, wherein the configuration settings are stored as a tenant-agnostic security baseline configuration.

10. The system of claim 9, wherein the storage device further comprises instructions, which when executed by the processing unit, further configure the processing unit to perform operations comprising:
executing variance detection between the tenant-agnostic security baseline configuration and configuration settings of the target tenant organization.

11. The system of claim 10, wherein the storage device further comprises instructions, which when executed by the processing unit, further configure the processing unit to perform operations comprising:
as a result of the variance detection, receiving a conflict between the tenant-agnostic security baseline configuration and the configuration settings of a second tenant organization.

12. The system of claim 11, wherein the storage device further comprises instructions, which when executed by the processing unit, further configure the processing unit to perform operations comprising:
resolving the conflict according to an ordered priority list of conflict types.

13. The system of claim 8, wherein recursively accessing the configuration settings of the source tenant organization includes accessing multiple dimensions of a setting.

14. The system of claim 13, wherein a dimension of the multiple dimensions is a user dimension.

15. A computer-readable storage device comprising instructions, which when executed by a processing unit, configure the processing unit to perform operations comprising:
receiving a request to extract configuration settings of a source tenant organization from a data store, wherein the configuration settings define operational parameters that control how a multi-tenant service processes data associated with the source tenant organization;
in response to the request, accessing the configuration settings of the source tenant organization;
generating a configuration tree data structure based on the accessed configuration settings, the configuration tree data structure organized as a plurality of key-value pairs;
selecting a target tenant organization;
based on the configuration tree data structure, generating a deployment order including chained API calls structured to modify configuration settings of the target tenant organization in the multi-tenant service, wherein the deployment order comprises instructions determined from dependencies derived from the configuration tree data structure; and
modifying the configuration settings of the target tenant organization for the multi-tenant service by executing the deployment order including the chained API calls.

16. The computer-readable storage device of claim 15, wherein the configuration settings are stored as a tenant-agnostic security baseline configuration.

17. The computer-readable storage device of claim 16, wherein the computer-readable storage device further comprises instructions, which when executed by the processing unit, further configure the processing unit to perform operations comprising:
executing variance detection between the tenant-agnostic security baseline configuration and configuration settings of the target tenant organization.

18. The computer-readable storage device of claim 17, wherein the computer-readable storage device further comprises instructions, which when executed by the processing unit, further configure the processing unit to perform operations comprising:
as a result of the variance detection, receiving a conflict between the tenant-agnostic security baseline configuration and the configuration settings of the target tenant organization.

19. The computer-readable storage device of claim 18, wherein the computer-readable storage device further comprises instructions, which when executed by the processing unit, further configure the processing unit to perform operations comprising:
resolving the conflict according to an ordered priority list of conflict types.

20. The computer-readable storage device of claim 15, wherein recursively accessing the configuration settings of the source tenant organization includes accessing multiple dimensions of a setting.

* * * * *